(12) United States Patent
Kuan (10) Patent No.: US 7,731,428 B2
(45) Date of Patent: Jun. 8, 2010

(54) BICYCLE HUB (75) Inventor: Kim Hong Kuan, Johor Darul Takzim (MY)

(73) Assignee: Shimano Components (Malaysia) Sdn. Bhd., Johor (MY)

(*) Notice: Subject to any disclaimer, the term of this patent is extended or adjusted under 35 U.S.C. 154(b) by 1125 days.

(21) Appl. No.: 11/206,840

(22) Filed: Aug. 19, 2005

(65) Prior Publication Data
US 2007/0041674 A1 Feb. 22, 2007

(51) Int. Cl.
F16C 13/00 (2006.01)
(52) U.S. Cl. .................................... 384/545
(58) Field of Classification Search ............... 384/480, 384/488, 545, 462, 536, 539, 544; 301/110.5, 301/110.6, 124.1, 105.1, 126, 131; 403/13, 403/14; 24/713.6; 285/921
See application file for complete search history.

(56) References Cited

U.S. PATENT DOCUMENTS

| 958,548 | A | * | 5/1910 | Sapp ........................ 384/545 |
| 1,457,653 | A | * | 6/1923 | Cerrato ...................... 384/488 |
| 2,287,357 | A | * | 6/1942 | Tage ......................... 384/473 |
| 4,406,504 | A | * | 9/1983 | Coenen et al. .............. 384/545 |
| 5,383,729 | A | * | 1/1995 | Hsieh ........................ 384/545 |
| 5,531,510 | A | | 7/1996 | Yamane |
| 5,575,540 | A | | 11/1996 | Chi |
| 6,019,017 | A | * | 2/2000 | Lin ......................... 74/551.1 |
| 2005/0185872 | A1 | | 8/2005 | Kanehisa et al. |

FOREIGN PATENT DOCUMENTS

| DE | 804405 | 4/1951 |
| DE | 906051 | 3/1954 |
| JP | 52-60062 U | 5/1977 |

* cited by examiner

Primary Examiner—Thomas R Hannon
Assistant Examiner—Phillip A Johnson
(74) Attorney, Agent, or Firm—Global IP Counselors, LLP (57) ABSTRACT A bicycle hub is provided that comprises a hub axle, a hub body rotatably mounted on the hub axle by a pair of bearings and at least one of the bearings having an inner tube. The bearings include an outer ring operatively coupled to the hub body, an inner ring operatively coupled to the hub axle, and a plurality of rolling components disposed between the outer ring and the inner ring. The inner tube is disposed with respect to the outer ring of at least one of the bearings such that at least a portion of the inner tube is disposed about the outer peripheral surface of the hub axle to form a small prescribed radial clearance therebetween.

23 Claims, 8 Drawing Sheets

BICYCLE HUB

BACKGROUND OF THE INVENTION

1. Field of the Invention

The present invention generally relates to a bicycle hub of a bicycle wheel that is mounted to a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well. One component that has been extensively redesigned is the hub of the bicycle.

Generally, bicycle hubs have a hub shaft or axle mounted in a non-rotatable manner to a rear part of the bicycle frame and a hub shell or body mounted in a rotatable manner to the hub axle by a pair of bearing assemblies. In the case of front hubs, the hub shell or body is freely rotatable on the hub axle in both directions. However, in the case of some rear hubs, one side of the rear hub is provided with a drive body or driving cylinder that is mounted in a freely rotatable manner to one end of the hub shell, and a one-way clutch arranged between the driving cylinder and the hub shell to transmit rotation from the driving cylinder to the hub shell in one direction. The driving cylinder is configured and arranged to have a plurality of sprockets mounted to a radially outward-facing surface of the driving cylinder such that the sprockets can neither rotate nor move axially with respect to the driving cylinder. Thus, the driving cylinders of these types of rear hubs only rotate in one direction on their hub axles.

One example of a conventional bicycle hub is disclosed in Japanese Utility Model Publication No. S52-60062. This conventional bicycle hub is installed in the central portion of a wheel of a bicycle with spokes extending from the hub to a rim. This conventional bicycle hub has a hub axle, a hub body and a pair of bearings. The hub axle is non-rotatably mounted to a frame of the bicycle (for example, to a front-fork). The hub body is coaxially coupled to the hub axle so that the hub body is disposed radially outwardly with respect to the hub axle. The bearings are configured and arranged to support the hub body so that the hub body can freely rotate around the hub axle. The outer peripheral surface of the hub axle includes a pair of male screw sections in axial ends thereof so that the hub is mounted to the frame by a pair of nuts that are screw on axial ends of the male screw of the hub axle. The bearings are angular-type bearings. Each of the bearings is provided with an outer ring or cup, an inner ring or cone, and a plurality of rolling components (balls). The outer ring is disposed along an inner peripheral surface of the hub body and includes a ball receiving surface. The inner ring is screwed into the hub axle and includes a ball pushing surface. The rolling components are disposed between the outer ring and the inner ring at predetermined intervals in a circumferential direction of the hub.

The inner portion of each of the bearings is filled with grease in order to make the rotation of the bearings smooth. The ball receiving surface of the outer ring is arranged as a concaved surface that faces toward a generally axial outward direction of the hub axle. The ball pushing surface of the inner ring is arranged as a concaved surface that faces toward a generally axial inward direction of the hub axle. The angular-type ball bearing installed on the hub is designed to maintain a certain degree of clearance or gap between the radial innermost peripheral surface of the outer ring and an outer peripheral surface of the hub axle. Moreover, a sealing component is coupled to an outer axial direction of the bearing. Therefore, the bearing is designed so that the grease does not leak towards the outer axial direction of the bearing.

However, since there is the clearance between the outer ring and the hub axle in at an axial inner position of the bearing, the grease filled within the bearing occasionally leaks towards the inner axial direction of the bearing. Especially when the hub includes the male screw section is formed in the same screw direction along the entire surface of the outer peripheral surface of the hub axle, the male screw acts like a pump due to the rotation of the wheel (i.e., the rotation of the outer ring of the bearing) relative to the hub axle. Consequently, the grease flows out from the bearing toward the inner axial direction of the hub axle. For example, in a case in which the male screw is a right-handed screw, in the bearing on the right side as viewed from the rear side of the bicycle, when the wheel rotates in the direction of travel, the grease tends to flow out toward the inner axial direction of the hub axle. When the grease flows out from the bearing toward the inner axial direction of the hub axle, the grease tends to travel toward a relatively larger space behind the outer ring and retained in that space due to the centrifugal force. In such a case, the amount of the grease in the bearing becomes insufficient, and rotation of the wheel deteriorates.

In view of the above, it will be apparent to those skilled in the art from this disclosure that there exists a need for an improved bicycle hub. This invention addresses this need in the art as well as other needs, which will become apparent to those skilled in the art from this disclosure.

SUMMARY OF THE INVENTION

One object of the present invention is to provide to a hub with a structure that substantially prevent grease from flowing out from the bearing toward the inner axial direction.

Another object of the present invention is to provide at least one of the bearings of a hub with an inner tube that is relatively easy to assembly.

In order to achieve the above mentioned object and other objects of the present invention, a bicycle hub is provided that comprises a hub axle, a hub body, a first bearing, a second bearing and an inner tube. The hub axle has a first axle end and a second axle end. The hub body has a first body end and a second body end with the hub body being coaxially disposed about the hub axle and rotatable with respect to the hub axle. The first bearing is disposed between the first body end of the hub body and the first end of the hub axle. The second bearing is disposed between the second body end of the hub body and the second axle end of the hub axle. The inner tube has a first axial end fixedly attached to the first bearing and a second axial end spaced axially from the second bearing such that the inner tube is held in a cantilever manner by the first bearing.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
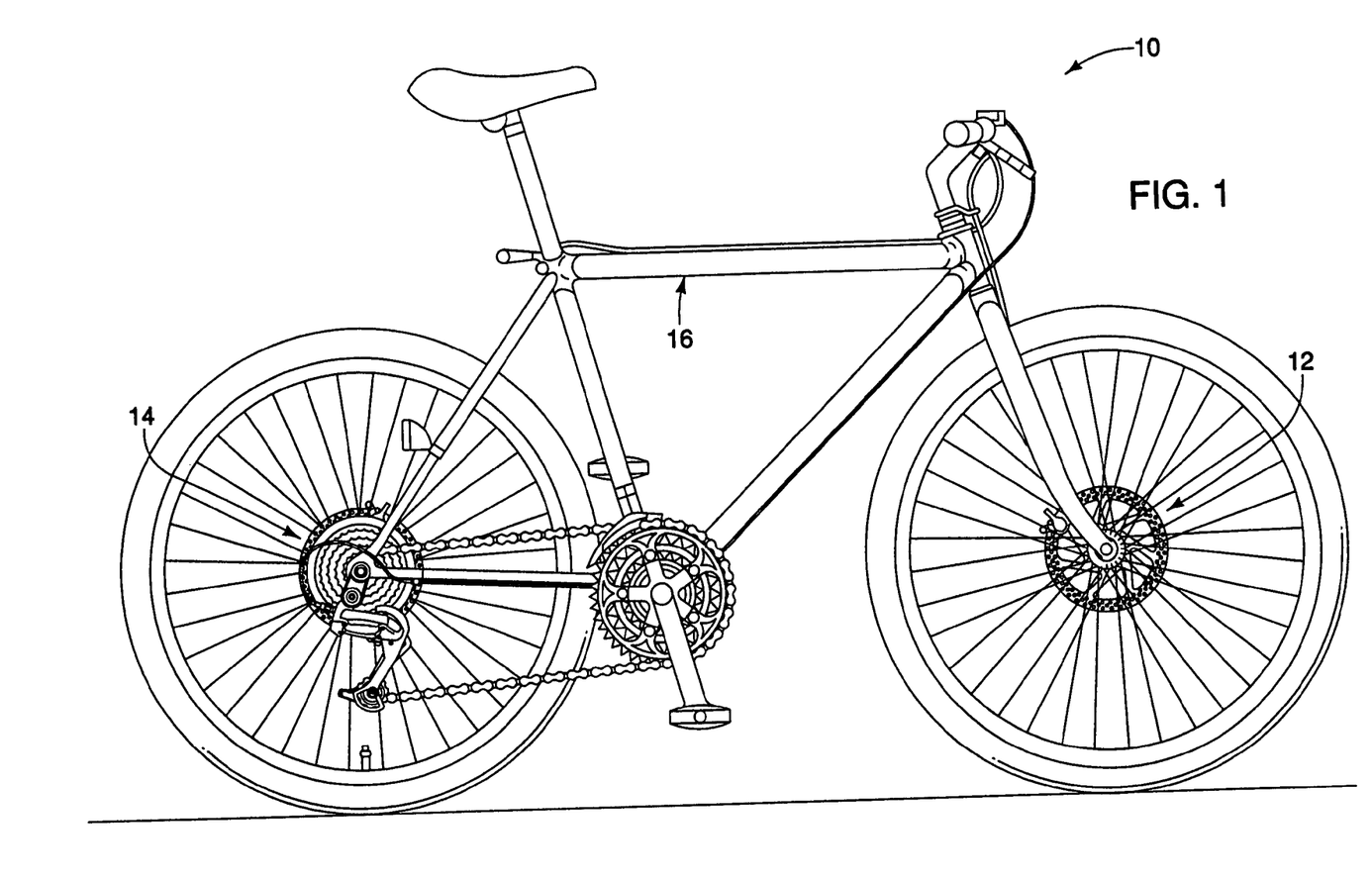
FIG. 1 is an overall right side elevational view of a bicycle provided with a front hub and a rear hub in accordance with a first embodiment of the present invention.

Referring initially to FIG. 1, a bicycle 10 is illustrated that is equipped with a front hub 12 and a rear hub 14 in accordance with a first embodiment of the present invention. The bicycle hubs 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle hubs 12 and 14 will be discussed and illustrated in detail herein. Moreover, various conventional bicycle parts such as brakes, additional sprockets, derailleurs, etc., which may or may not be illustrated herein, can be used in conjunction with the present invention.

Figure 2:
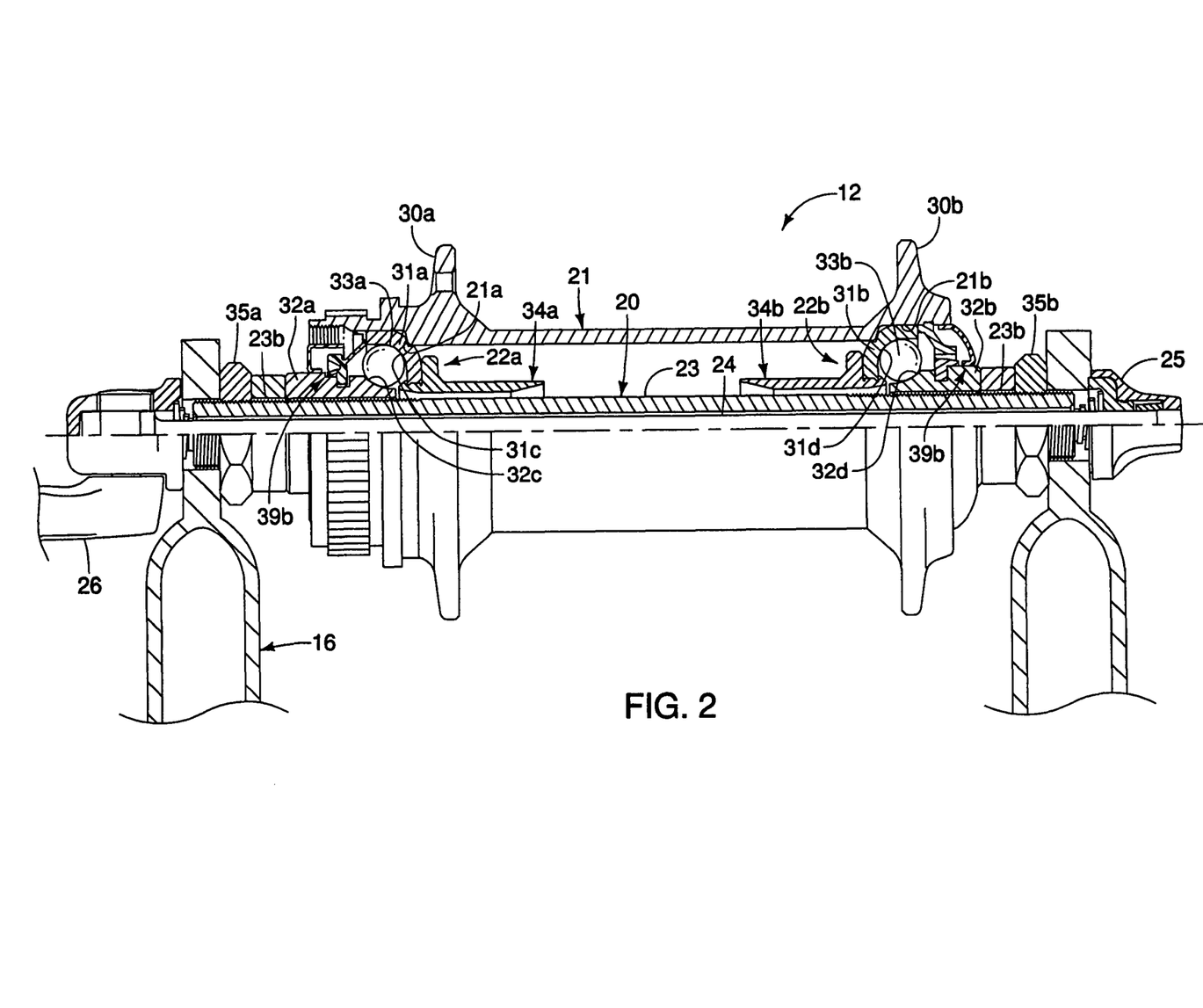
FIG. 2 is a partial cross sectional view of the front hub provided with a pair of bearings with an inner tube coupled to each of the outer cups of the bearings in accordance with the first embodiment of the present invention.

As shown in FIG. 2, the front hub 12 basically includes a hub axle 20, a hub body or shell 21, and a pair of left and right bearings 22a and 22b. The hub axle 20 is configured to be freely attachable to or detachable from the bicycle frame 16 in a conventional manner. The hub body 21 is coaxially disposed radially outwardly with respect to the hub axle 20. The left bearing 22a and the right bearing 22b are disposed between the hub axle 20 and the hub body 21 at axial end portions of hub body 21 as seen in FIG. 2. The hub body 21 is freely rotatable on the hub axle 20 in both rotational directions by the hub axle 20.

In the illustrated embodiment, the hub axle 20 of the front hub 12 is arranged as a quick release lever type hub axle, which basically includes a hollow axle body 23, a quick hub rod 24, an adjusting nut 25 and a cam lever 26. The axle body 23 has a right handed male screw section 23a on the outer peripheral surface of the left end of the axle body 23 and a right handed male screw section 23b on the outer peripheral surface of the right end of the axle body 23. The male screw section 23a is arranged to extend from a portion located slightly inside of the portion to which the left bearing 22a is mounted toward the outward axial direction. The male screw section 23b is arranged to extend from a portion located slightly inside of the portion to which the right bearing 22b is mounted toward the outward axial direction. The left and right bearings 22a and 22b are threadedly mounted to the axle body 23 by the screw sections 23a and 23b, respectively. The quick hub rod 24 penetrates through the axle body 23 with the adjusting nut 25 screwed on one axial end thereof. The cam lever 26 is coupled to the other axial end of the quick hub rod 24. This quick release arrangement operates in a conventional manner, and thus, it will not be discussed in further detail herein.

The hub body 21 of the front hub 12 has a generally tubular shape and is, for example, made of aluminum alloy. The hub body 21 includes a pair of hub flanges 30a and 30b on the outer peripheral surface for attaching spokes thereto in conventional manner. The hub body 21 further includes a pair of bearing mounting sections 21a and 21b at each axial end portion for receiving the left bearing 22a and the right bearing 22b, respectively.

The left bearing 22a basically includes a left outer ring or cup 31a, a left inner ring or cone 32a and a plurality of generally spherical rolling components 33a (only one left rolling component 33a is shown in FIG. 2), with a left inner tube or member 34a attached to the left outer ring 31a. Similarly, the right bearing 22b basically includes a right outer ring 31b, a right inner ring 32b and a plurality of generally spherical rolling components 33b (only one right rolling component is shown in FIG. 2), with a right inner tube or member 34b attached to the right outer ring 31b. As seen in FIG. 2, the left outer ring 31a of the left bearing 22a and the right outer ring 31b of the right bearing 22b are pressed into the bearing mounting sections 21a and 21b of the hub body 21, respectively, which are formed on the inner perimeter in the axial end portions of the hub body 21.

Figures 3, 4:
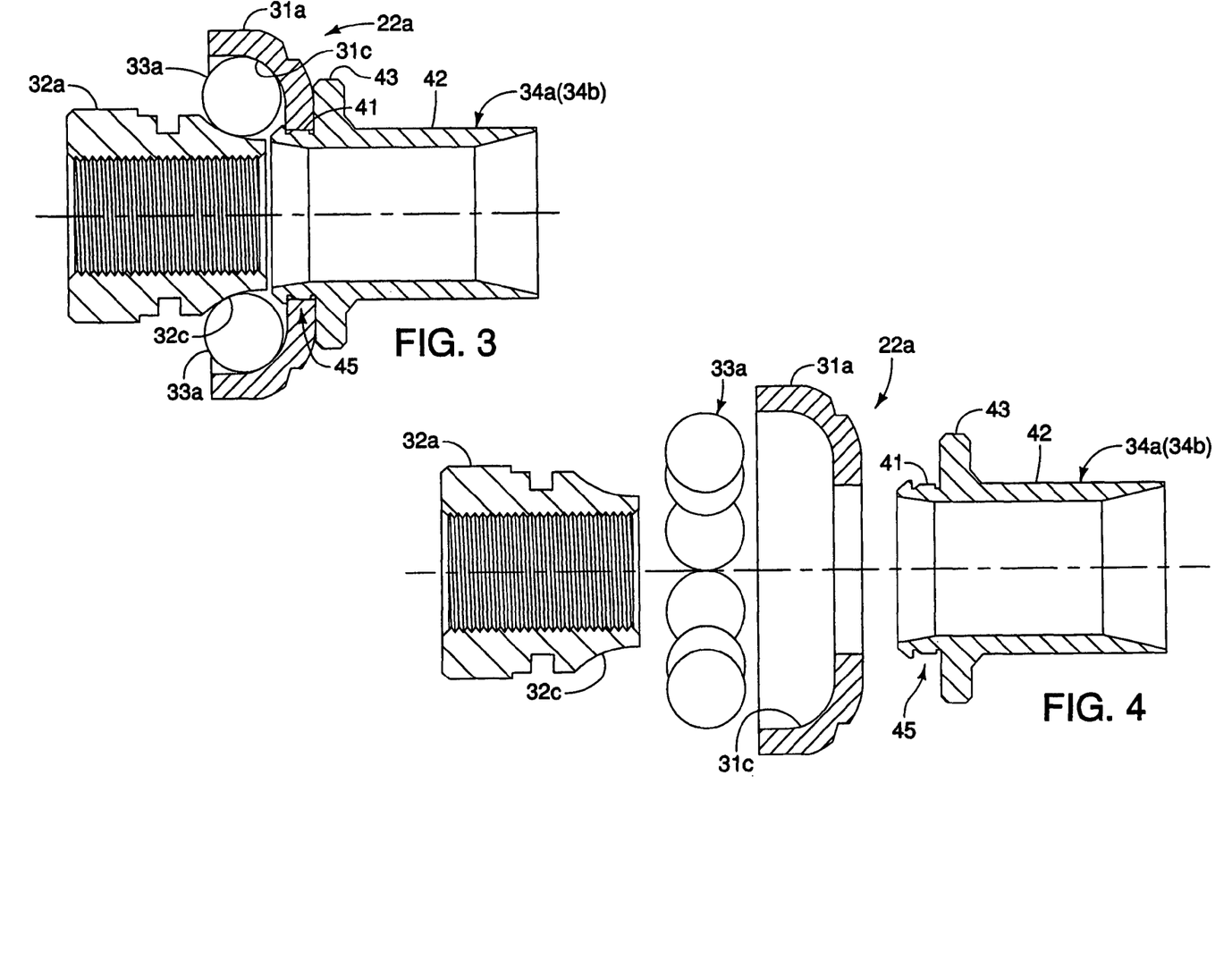
FIG. 3 is an enlarged cross sectional view of one of the bearings for the front hub illustrated in FIG. 2 with the inner tube coupled to the outer cup in accordance with the first embodiment of the present invention.
FIG. 4 is an enlarged exploded cross sectional view of the bearing and the inner tube illustrated in FIG. 3.

As best seen in FIG. 3, the left outer ring 31a includes a ball receiving surface (outer bearing surface) 31c that faces in a generally axial outward direction towards the first or left axle end of the hub axle 20. The left inner ring 32a includes a ball pushing surface (inner bearing surface) 32c that faces in a generally axial inward direction towards the second or right axle end of the hub axle 20. As seen in FIG. 2, the right outer ring 31b includes a ball receiving surface (outer bearing surface) 31d that faces in a generally axial outward direction towards the second or right axle end of the hub axle 20. The right inner ring 32b includes a ball pushing surface (inner bearing surface) 32d that faces in a generally axial inward direction towards the first or left axle end of the hub axle 20.

Therefore, the left bearing 22a and the right bearing 22b are arranged as angular ball bearings, in which the load capacity relative to the thrust direction is greater. The first axial end of the left inner tube 34a is attached to an inner edge of the left outer ring 31a, while the first axial end of the right inner tube 34b is attached to an inner edge of the right outer ring 31b in the same manner as the left inner tube 34a is attached to the left outer ring 31a as explained later.

The left and right inner rings 32a and 32b have internal bores with female threads that are screwed into the screw sections 23a and 23b, which are formed on the outer peripheral surface of the axle body 23 of the hub axle 20. The axial positions of the left inner ring 32a and the right inner ring 32b are locked by a pair of lock nuts 35a and 35b that are installed in contact with the axial end surfaces of the left inner ring 32a and the right inner ring 32b, respectively. Therefore, the left inner ring 32a and the right inner ring 32b are not movable in the axial direction. The front hub 12 also includes a pair of sealing components 39a and 39b for sealing the end gaps between the hub body 21 and the left and right inner rings 32a and 32b. Thus, the sealing components 39a and 39b are disposed in the outer axial end portions of the left bearing 22a and the right bearing 22b, respectively.

In the front hub 12 of this embodiment, the left inner tube 34a has a first axial end fixedly attached to the left bearing 22a and a second axial end spaced axially from the right bearing 22b such that the left inner tube 34a is held in a cantilever manner by the left bearing 22a. Similarly, the right bearing 22b has a first axial end fixedly attached to the right bearing 22b and a second axial end spaced axially from the left bearing 22a such that the right inner tube 34b is held in a cantilever manner by the right bearing 22b. Accordingly, a gap exists between the inner ends of the left and right inner tubes 34a and 34b. Since the left and right inner tubes 34a and 34b are identical except for their orientations when installed, only the left inner tube 34a will be discussed and illustrated in detail herein. In other words, the description of the left inner tube 34a applies to the right inner tube 34b.

Figure 5:
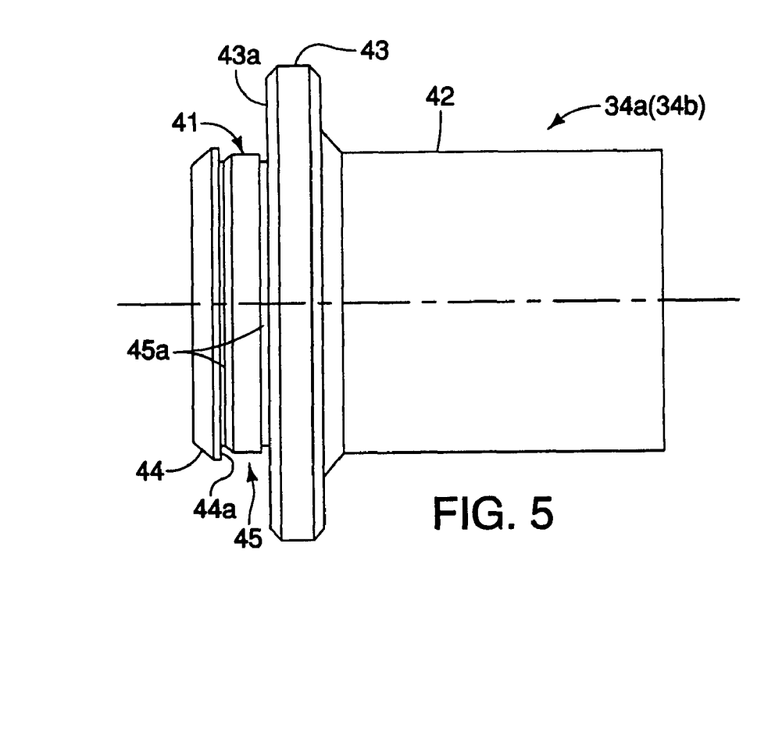
FIG. 5 is an elevational view of the inner tube illustrated in FIG. 4 for the bearing illustrated in FIGS. 3 and 4.
Figure 6:
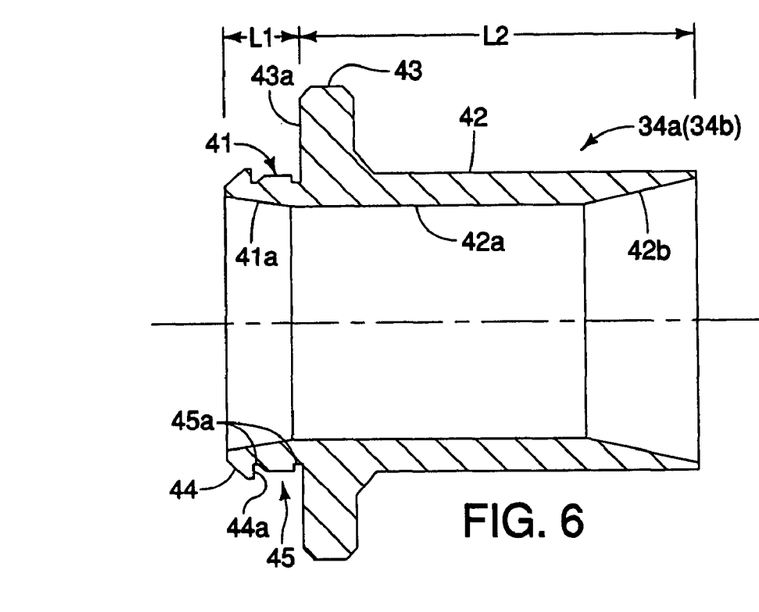
FIG. 6 is a longitudinal cross sectional view of the inner tube cup in accordance with the first embodiment of the present invention.

As seen in FIGS. 5 and 6, the left inner tube 34a is a one-piece, unitary member that basically has a first tubular end section 41 and a second tubular end section 42 with an annular flange portion (abutment member) 43. The first tubular end section 41 has a first longitudinal length L1, while the second tubular end section 42 has a second longitudinal length L2 with the first longitudinal length L1 form a ratio (L1/L2) with the second longitudinal length L2 such that the ratio (L1/L2) preferably lies between a ratio range of 1 to 4 and 1 to 6.

Preferably, the left inner tube 34a is formed of a hard rigid material with a limited degree of flexibility. For example, the left inner tube 34a is molded from a hard rigid plastic material that can be snap fitted onto the inner radial surface of the left outer ring 31a.

In this embodiment, the first axial end of the left inner tube 34a is attached to the left bearing 22a by a press fit connection. In particular, the left inner tube 34a is installed by pushing the left inner tube 34a into the left outer ring 31a of the left bearing 22a so that the first axial end of the first tubular end section 41 of the left inner tube 34a is resiliently deflected inwardly and then springs back to secure the left inner tube 34a into the left outer ring 31a of the left bearing 22a.

The first tubular end section 41 of the left inner tube 34a has an engagement member 44 formed at its free axial end. The engagement member 44 extends radially outwardly to form an annular retaining surface 44a. The annular retaining surface 44a faces in an axial direction towards the annular flange portion 43. Thus, the annular retaining surface 44a faces in an axial direction towards the second axle end of the front hub 12 when the left bearing 22a and the left inner tube 34a are installed into front hub 12. An annular groove 45 is formed by the annular retaining surface 44a of the engagement member 44 and the annular flange portion 43 such that the left outer ring 31a of the left bearing 22a is retained therebetween. In other words, the left inner tube 34a is attached at its free axial end to the left bearing 22a by a pair of axially spaced apart oppositely facing surfaces with a portion (the left outer ring 31a) of the left bearing 22a being disposed therebetween. In this embodiment, the engagement member 44 is a non-removable part of the left inner tube 34a, e.g., a unitary part of the left inner tube 34a. However, the engagement member 44 can be a separate member that is releasable and reinstallable, for example, by threads.

The first tubular end section 41 of the left inner tube 34a further includes a pair of circumferentially extending flexibility increasing recesses 45a disposed in the annular groove 45. A first of the flexibility increasing recesses 45a is located adjacent the engagement member 44, while the second of the flexibility increasing recesses 45a is located adjacent the annular flange portion 43 that forms the abutment member of the left inner tube 34a. Preferably, the flexibility increasing recesses 45a extend in circumferential directions so as to form continuous annular recesses.

As seen in FIG. 6, the first tubular end section 41 (first axial end) of the left inner tube 34a has an inner surface with a tapered (conical) section 41a that is located at its free axial end such that the tapered part 41a increases in diameter as the inner surface approaches the free edge of the tubular end section 41 of the left inner tube 34a. In other words, the inner surface of the left inner tube 34a along the first tubular end section 41 is preferably arranged such that the inner diameter of the first axial end of the left inner tube 34a gradually becomes larger from a point corresponding to the left side of the annular flange portion 43 towards the first axial end in a tapered manner.

The second tubular end section 42 of the left inner tube 34a has an inner surface with a cylindrical part 42a and a tapered (conical) part 42b that is located at its free axial end such that the tapered part 42b increases in diameter as the inner surface approaches the free edge of the tubular end section 42 of the left inner tube 34a. In other words, the inner surface of the left inner tube 34a is preferably arranged such that the inner diameter of the second axial end of the second tubular end section 42 is larger than the diameter of the first axial end of the second tubular end section 42, and the diameter of the left inner tube 34a gradually becomes larger from the cylindrical part 42a towards the second axial end in a tapered manner. This tapered part 42b of the inner surface of the left inner tube 34a makes it easier to install the left inner tube 34a on the hub axle 20.

The first tubular end section 41 (first axial end) of the left inner tube 34a is coupled to the radial innermost surface of the left outer ring 31a such that a certain degree of clearance is maintained between an inner surface of the left inner tube 34a at the cylindrical part 42a and the outer peripheral surface of the axle body 23 of the hub axle 20. The clearance between the radial innermost peripheral surface at the cylindrical part 42a of the left inner tube 34a and the male screw section 64a formed on the axle body 23 of the hub axle 20 is preferably set to a substantially small value, e.g., approximately 0.4 mm.

As mentioned above, the annular flange portion 43 is configured and arranged to form the abutment member of the left inner tube 34a for retaining the left outer ring 31a of the left bearing 22a on the left inner tube 34a. Thus, the annular flange portion 43 is a radially extending abutment member with an abutment face 43a facing axially towards the free axle end first tubular end section 41 of the left inner tube 34a. In the illustrated embodiment, the annular flange portion 43 is a continuous flange. However, the annular flange portion 43 can be replaced with a plurality of separate and discrete flanges or elements that together form the abutment member.

The cylindrical part 42a of the inner surface of the left inner tube 34a has a uniform diameter that is closely disposed to the outer peripheral surface of the axle body 23 of the hub axle 20. Likewise, the corresponding inner surface of the right inner tube 34b is provided with a uniform diameter that is closely disposed to the outer peripheral surface of the axle body 23 of the hub axle 20. With the front hub 12 in the first embodiment as described above, a clearance or gap between each of the outer rings 31a and 31b and the axle body 23 is narrowed by providing the inner tubes 34a and 34b between the axle body 23 of the hub axle 20 and the left and right outer rings 31a and 31b. Thus, a small clearance or gap (approximately 0.4 mm) is formed between the axle body 23 and each of the inner surfaces of the inner tubes 34a and 34b in the radial direction of the hub axle 20. Thus, the grease contained inside the left bearing 22a and the right bearing 22b is less likely to leak toward the inner axial direction of the hub axle 20. In particular, when the front wheel rotates in the direction of travel, if the inner tubes 34a and 34b were not provided in the bearings 22a and 22b, then the grease tends to leak out from the bearings 22a and 22b. However, by installing the inner tube 34b as seen in FIG. 2, the clearance between the outer rings 31a and 31b and the hub axle 20 is narrowed. Consequently, the grease is less likely to leak in the inner axial direction of the hub axle 20 and more likely to be retained within the bearings 22a and 22b. In addition, because there is the clearance (approximately 0.4 mm) between the inner tubes 34a and 34b and the left the hub axle 20, the deterioration of rotational performance of the left and right bearings 22a and 22b can be prevented.

Figure 7:
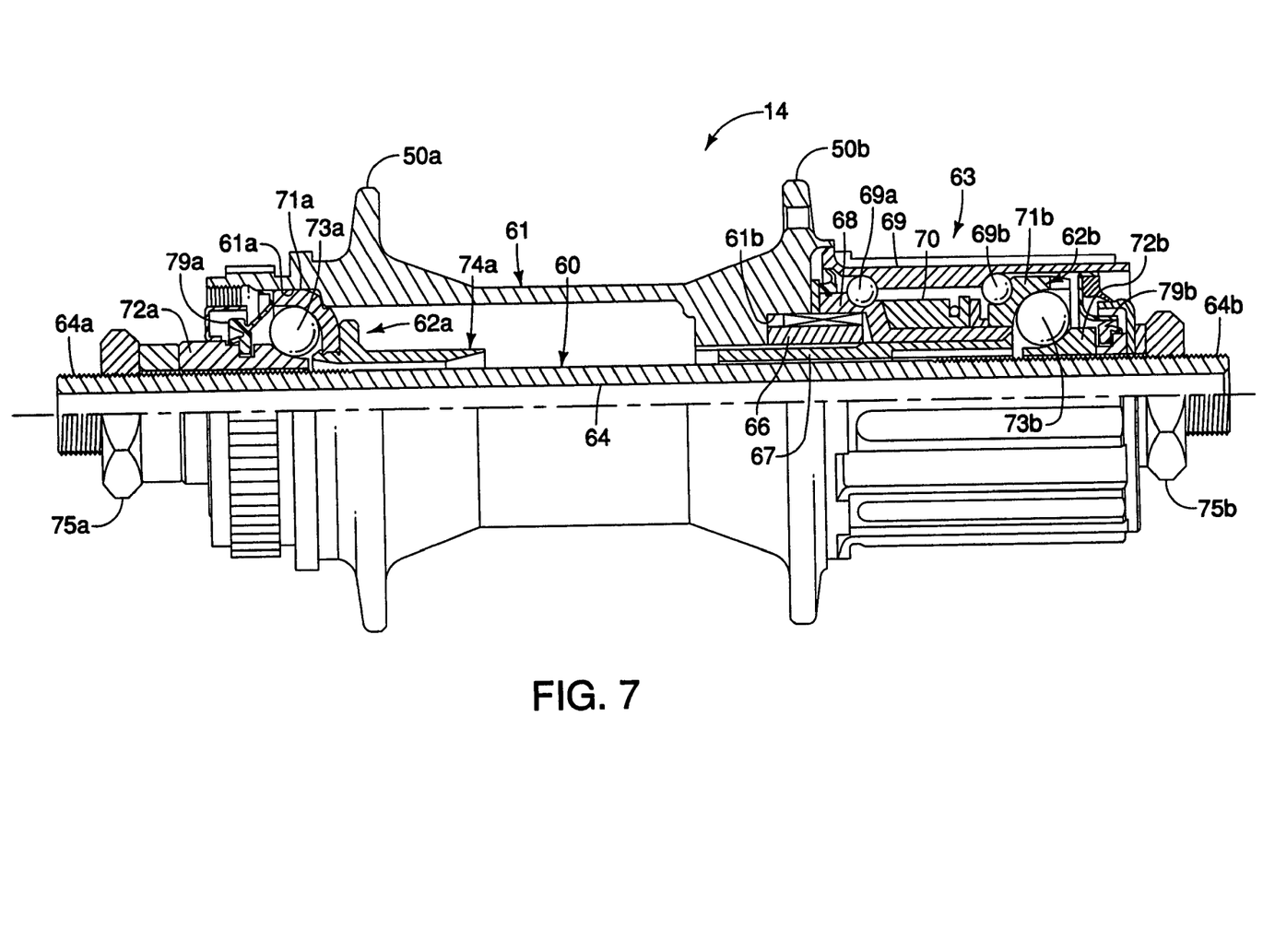
FIG. 7 is a partial cross sectional view of the rear hub with a bearing with an inner tube coupled to the outer cup of the bearing in accordance with the first embodiment of the present invention.

As shown in FIG. 7, the rear hub 14 basically includes a hub axle 60, a hub body 61, a left bearing 62a, a right bearing 62b and a freewheel 63 in which the right bearing 62b is part thereof. As explained below, an inner tube is used with the left bearing 62a of the rear hub 14 in the same manner as in the front hub 12. Thus, the benefits of using the inner tubes 34a and 34b with the bearings 22a and 22b also applies to the left bearing 62a of this rear hub 14. With the freewheel 63 of this rear hub 14, the use of one of inner tubes with the right bearing 62b is not necessary.

The hub axle 60 is freely attachable to or detachable from the rear of the frame 16 in a conventional manner. The hub body 61 is coaxially disposed radially outwardly with respect to the hub axle 60. The freewheel 63 is operatively coupled between the hub axle 60 and the hub body 61 in a relatively conventional manner. The left bearing 62a is disposed between the hub axle 60 and the hub body 61 in one axial end portion of the hub body 61, while the right bearing 62b is part of the freewheel 63, which is operatively disposed between the other axial ends of the hub axle 60 and the hub body 61. The freewheel 63 is also configured to be non-rotatably support a multiple-layer sprockets (e.g., 10 sprockets) in a conventional manner.

The hub axle 60 of the rear hub 14 is, for example, a quick release type hub axle in which only a hollow axle body 64 is shown. Basically, the other parts of the quick release are the same as the front hub 12, but for their dimensions. The hollow axle body 64 has a pair of right-handed male screw sections 64a and 64b on the outer peripheral surface thereof. The male screw section 64a is arranged to extend from a portion located slightly inside of the portion to which the left bearing 62a is mounted toward the outward axial direction. The male screw section 64b is arranged to extend from a portion located slightly inside of the portion to which the freewheel 63 is mounted toward the outward axial direction. The structure of the hub axle 60 is basically identical to that of the hub axle 20 of the front hub 12, except for dimensions of the hub axle 60. Therefore, the structure of the hub axle 60 will not be discussed in detail herein for the sake of brevity.

The hub body 61 of the rear hub 14 has a generally tubular shape that is made of aluminum alloy. The hub body 61 further includes a pair of mounting sections 61a and 61b at each axial end portion for receiving the left bearing 62a and the freewheel 63, respectively. The hub body 61 is provided with a pair of hub flanges 65a and 65b on the outer peripheral surface for attaching spokes in a conventional manner.

The left bearing 62a is mounted to the mounting section 61a of the hub body 61 in the same manner as the left bearing 22a of the front hub 12, while the freewheel 63 is threadedly attached in the mounting section 61b. Thus, the right bearing 62b of the freewheel 63 supports the right end of the hub body 61 on the hub axle 60.

In addition to the right bearing 62b, the structure of the freewheel 63 further includes a power transmission member 66, a cylindrical mounting bolt 67, a driven member 68, a drive body or driving cylinder 69 that is mounted in a freely rotatable manner to one end of the hub body 61 by first and second freewheel bearings 69a and 69b, and a one-way clutch 70 arranged between the driven member 68 and the driving cylinder 69 to transmit rotation from the driving cylinder 69 to the hub body 61 in one direction.

The driving cylinder 69 is configured and arranged to have a plurality of sprockets mounted to a radially outward-facing surface of the driving cylinder 69 such that the sprockets can neither rotate nor move axially with respect to the driving cylinder 69. The driving cylinder 69 is supported by the outer perimeter of the power transmission member 66 so that the driving cylinder 69 freely rotates around the power transmission member 66. More specifically, the driving cylinder 69 is supported by the first freewheel bearing 69a and the second freewheel bearing 69b such that the driving cylinder 69 freely rotates around the power transmission member 66. The one-way clutch 61 is disposed between the driving cylinder 69 and the power transmission member 66 to transmit only the rotation of the direction of travel of the driving cylinder 69 to the power transmission member 66.

Since the freewheel 63 is relatively conventional, it will not be discussed in further detail herein. The cylindrical bolt 67 and the axle body 64 are arranged such that a clearance or gap between the inner peripheral surface of the cylindrical bolt 67 and the outer peripheral surface of the axle body 64 is set to a substantially small value, for example, approximately 0.4 mm. Therefore, the grease leakage from the right bearing 62b toward the axial inner direction is not very problematic.

The clearance between the driving cylinder 69 and the hub axle 60, and the clearance between the driving cylinder 69 and the power transmission member 66, are sealed by a pair of sealing components. Therefore, the grease inside the bearings is unlikely to leak to the outside of the freewheel 63.

The left bearing 62a basically includes a left outer ring or cup 71a, a left inner ring or cone 72a and a plurality of generally spherical rolling components 73a (only one left rolling component 73a is shown in FIG. 7), with a left inner tube or member 74a attached to the left outer ring 71a. The left bearing 62a of the rear hub 14 is identical to the left bearing 22a of the front hub 12, and thus, the left bearing 62a of the rear hub 14 will not be discussed in further detail herein. In other words, the descriptions of the left bearing 22a of the front hub 12 applies to the left bearing 62a with the left inner tube 74a. The right bearing 62b basically includes a right outer ring or cup 71b, a right inner ring or cone 72b and a plurality of generally spherical rolling components 73b (only one right rolling component 73b is shown in FIG. 7). The inner tube 74a is identical to the inner tubes 34a as discussed above.

The axial positions of the first inner ring 72a and the right inner ring 72b are locked by lock nuts 75a and 75b, which are installed in contact with the axial outer surface of the left inner ring 72a and the right inner ring 72b, respectively. Therefore, the left inner ring 72a and the right inner ring 72b are not movable in the axial direction with respect to the hub body 61. A sealing component 79a is coupled to the axial outer end portion the left bearing 62a. A sealing component 79b is coupled to the axial outer end portion the right bearing 62b. Therefore, the grease contained in the bearings 62a and 62b is less likely to leak from the bearings 62a and 62b toward the axial outward direction.

Accordingly, similarly to the front hub 12, with the rear hub 14 of the first embodiment as described above, the clearance or gap (approximately 0.4 mm) between the left outer ring 71a and the axle body 64 of the hub axle 60 in the radial direction is narrowed by providing the inner tube 74a on the radial innermost peripheral surface of the left outer ring 71a. Therefore, the grease contained inside the left bearing 62a is less likely to leak toward the axial inner direction of the hub axle 60. Since the inner tube 74a is disposed between the left outer ring 71a and the hub axle 60, the grease leakage from the left bearing 62a that is disposed on an axial side of the hub axle 60 that is opposite from where the freewheel 63 is mounted can be prevented.

Figure 8:
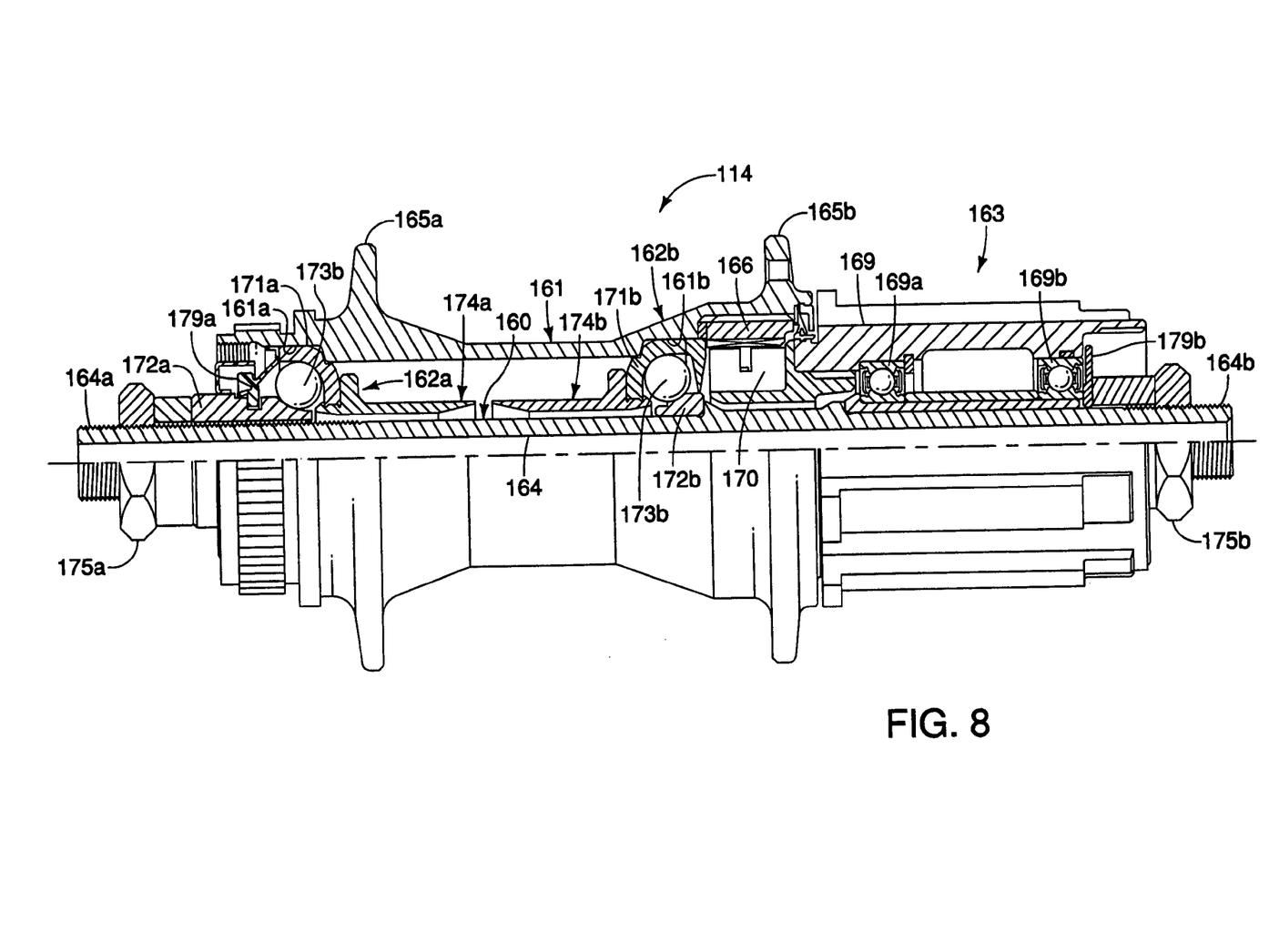
FIG. 8 is a partial cross sectional view of the rear hub with a bearing with an inner tube coupled to the outer cup of the bearing in accordance with the first embodiment of the present invention.

As shown in FIG. 8, a modified rear hub 114 is illustrated that can be used with the bicycle 10 of FIG. 1 by replacing the rear hub 14 with this modified rear hub 114. The modified rear hub 114 basically includes a hub axle 160, a hub body 161, a left bearing 162a, a right bearing 162b and a freewheel 163. As explained below, an inner tube is used with each of the bearings 162a and 162b of the rear hub 114 in the same manner as in the front hub 12. Thus, the benefits of using the inner tubes 34a and 34b with the bearings 22a and 22b also applies to the bearings 162a and 162b of this rear hub 114.

The hub axle 160 is freely attachable to or detachable from the rear of the frame 16 in a conventional manner. The hub body 161 is coaxially disposed radially outwardly with respect to the hub axle 160. The left bearing 162a and the right bearing 162b are operatively disposed between the hub axle 160 and the hub body 161 in one axial end portion of the hub body 161. The freewheel 163 is coupled to the axial end portion of the hub body 161 where the right bearing 162b is coupled to. The freewheel 163 is also configured to be non-rotatably support a multiple-layer sprockets (e.g., 10 sprockets) in a conventional manner.

The hub axle 160 of the rear hub 114 is, for example, a quick release type hub axle in which only a hollow axle body 164 is shown. Basically, the other parts of the quick release are the same as the front hub 12, but for their dimensions. The hollow axle body 164 has a pair of right-handed male screw sections 164a and 164b on the outer peripheral surface thereof. The male screw section 164a is arranged to extend from a portion located slightly inside of the portion to which the left bearing 162a is mounted toward the outward axial direction. The male screw section 164b is arranged to extend from a portion located slightly inside of the portion to which the freewheel 63 is mounted toward the outward axial direction. The structure of the hub axle 160 is basically identical to that of the hub axle 20 of the front hub 12, except for dimensions of the hub axle 160. Therefore, the structure of the hub axle 160 will not be discussed in detail herein for the sake of brevity.

The hub body 161 of the rear hub 114 has a generally tubular shape that is made of aluminum alloy. The hub body 161 further includes a pair of mounting sections 161a and 161b at each axial end portion for receiving the left bearing 162a and the right bearing 162b, respectively. The hub body 161 further includes a pair of hub flanges 165a and 165b on the outer peripheral surface for attaching spokes in a conventional manner.

The left bearing 162a is mounted to the mounting section 161a of the hub body 161 in the same manner as the left bearing 22a of the front hub 12, while the right bearing 162b is mounted to the mounting section 161b of the hub body 161 in the same manner as the right bearing 22b of the front hub 20. The mounting section 161b is also configured and arranged to receive a potion of the freewheel 163.

The freewheel 163 includes a power transmission member 166, a drive body or driving cylinder 169 that is mounted in a freely rotatable manner to one end of the hub body 161 by first and second freewheel bearings 169a and 169b, and a one-way clutch 170 arranged between the power transmission member 166 and the driving cylinder 69 to transmit rotation from the driving cylinder 169 to the hub body 161 in one direction.

The outer peripheral surface of the power transmission member 166 is non-rotatably coupled to the right axial end of the hub body 161 (right end of FIG. 8) by a serrated connection or the like. The power transmission member 166 is fixedly coupled to the hub body 161 by a retaining clip. The one-way clutch 170 is configured and arranged to be coupled to the power transmission member 166 as seen in FIG. 8.

The driving cylinder 169 is configured and arranged to have a plurality of sprockets mounted to a radially outward-facing surface of the driving cylinder 169 such that the sprockets can neither rotate nor move axially with respect to the driving cylinder 169. More specifically, the driving cylinder 169 is supported by the first freewheel bearing 169a and the second freewheel bearing 169b such that the driving cylinder 169 freely rotates around the axle body 164. The one-way clutch 170 is disposed between the driving cylinder 169 and the power transmission member 166 to transmit only the rotation of the direction of travel of the driving cylinder 169 to the power transmission member 166. Thus, the driving cylinder 169 is fixed to the one-way clutch 170.

The left bearing 162a of the rear hub 114 basically includes a left outer ring or cup 171a, a left inner ring or cone 172a and a plurality of generally spherical shaped rolling components 173a (only one rolling component 173a is shown in FIG. 8). The right bearing 162b basically includes a right outer ring 171b, a right inner ring 172b and a plurality of generally spherical shaped rolling components 173b (only one rolling component 173b is shown in FIG. 8). The left outer ring 171a is pressed into the mounting section 161a formed on the hub body 161, while the right bearing 162a is pressed into the mounting section 161b on the hub body 161. The bearings 162a and 162b have inner tubes 174a and 174b mounted thereto. The inner tubes 174a and 174b are identical to the inner tubes 34a and 34b as discussed above.

The axial positions of the first inner ring 172a and the right inner ring 172b are locked by lock nuts 175a and 175b, which are installed in contact with the axial outer surface of the left inner ring 172a and the right inner ring 172b, respectively. Therefore, the left inner ring 172a and the right inner ring 172b are not movable in the axial direction with respect to the hub body 161. A sealing component 179a is coupled to the axial outer end portion the left bearing 162a, while a sealing component 179b is coupled to the axial outer end portion the right bearing 162b. Therefore, the grease contained in the bearings 162a and 162b is less likely to leak from the bearings 162a and 162b in the outer axial directions.

Accordingly, similarly to the front hub 12, with the rear hub 114 as described above, the clearance or gap (approximately 0.4 mm) between the axle body 164 of the hub axle 160 and the outer rings 171a and 171b in the radial direction is narrowed by providing the inner tubes 174a and 174b on the radial innermost peripheral surfaces of the outer rings 171a and 171b. Therefore, the grease contained inside the bearings 162a and 162b is less likely to leak toward the axial inner directions of the hub axle 160.

Second Embodiment

Figure 9:
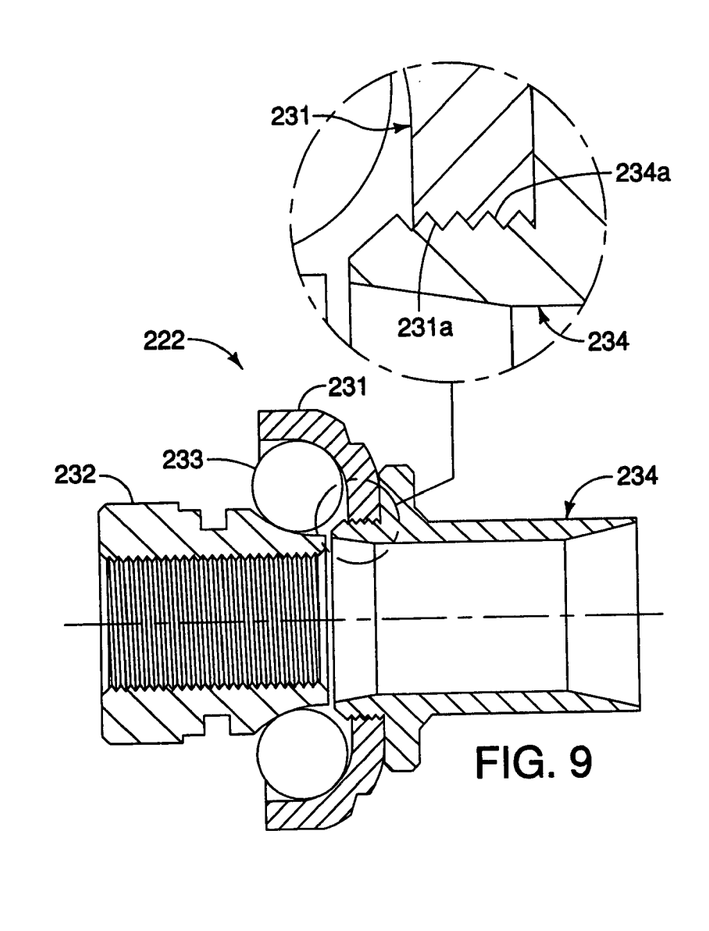
FIG. 9 is an enlarged cross sectional view of a modified bearing for use with anyone of the hubs illustrated in FIGS. 2, 7 and 8 with a modified inner tube coupled to the outer cup in accordance with a second embodiment of the present invention.

Referring now to FIG. 9, a modified bearing 222 and a modified inner tube 234 is illustrated in accordance with a second embodiment. Basically, the modified bearing 222 and the modified inner tube 234 are configured to be uses with anyone of the hubs 12, 14 and 114 that are illustrated in FIGS. 2, 7 and 8, where a bearing and an inner tube arrangement is utilized. The modified bearing 222 and the modified inner tube 234 are identical to the bearing 22a and the inner tube 34a, respectively, unless otherwise specified below.

The modified bearing 222 of the second embodiment basically includes an outer ring or cup 231, an inner ring or cone 232 and a plurality of generally spherical rolling components 233 (only two rolling components 233 are shown in FIG. 9), with the modified inner tube 234 attached to the outer ring 231. The modified bearing 222 of the second embodiment differs from the bearings 22a and 22b of the first embodiment in that internal threads 231a are provided on the innermost peripheral surface of the outer ring 231. The modified inner tube 234 of the second embodiment differs from the inner tubes 34a and 34b of the first embodiment in that external threads 234a are provided on the first tubular end section of the modified inner tube 234 for fixedly coupling the outer ring 231 thereto. Thus, the first axial end of the modified inner tube 234 is attached to the modified bearing 222 by a threaded connection formed therebetween.

Third Embodiment

Figure 10:
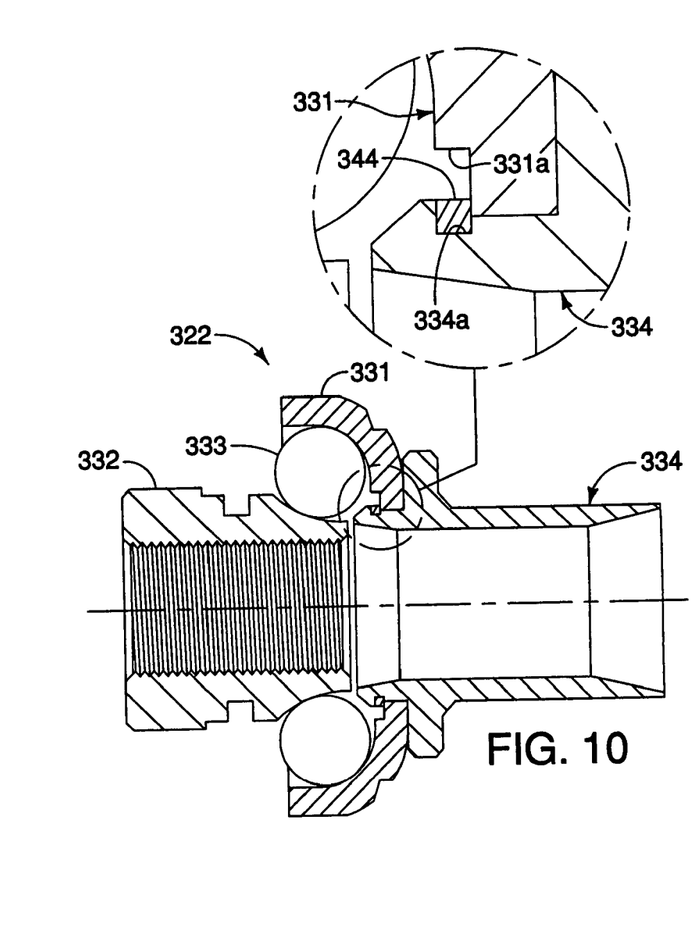
FIG. 10 is an enlarged cross sectional view of a modified bearing for use with anyone of the hubs illustrated in FIGS. 2, 7 and 8 with a modified inner tube coupled to the outer cup in accordance with a third embodiment of the present invention.

Referring now to FIG. 10, a modified bearing 322 and a modified inner tube 334 is illustrated in accordance with a third embodiment. Basically, the modified bearing 322 and the modified inner tube 334 are configured to be uses with anyone of the hubs 12, 14 and 114 that are illustrated in FIGS. 2, 7 and 8, where a bearing and an inner tube arrangement is utilized. The modified bearing 322 and the modified inner tube 334 are identical to the bearing 22a and the inner tube 34a, respectively, unless otherwise specified below.

The modified bearing 322 of the third embodiment basically includes an outer ring or cup 331, an inner ring or cone 332 and a plurality of generally spherical rolling components 333 (only two rolling components 333 are shown in FIG. 10), with the modified inner tube 334 attached to the outer ring 331. The modified bearing 322 of the third embodiment differs from the bearings 22a and 22b of the first embodiment in that an annular recess 331a is provided on the innermost peripheral surface of the outer ring 331. The modified inner tube 334 of the third embodiment differs from the inner tubes 34a and 34b of the first embodiment in that an annular recess 334a are provided on the first tubular end section of the modified inner tube 334 for receiving an engagement member 344 that fixedly couples the outer ring 331 thereto. In the illustrated embodiment, the engagement member 344 is a split retaining ring or clip. Thus, the engagement member 344 is a removable and reinstallable part of the inner tube 334. Alternatively, the engagement member can be a nut that is threaded onto the inner tube 234 of the second embodiment.

Fourth Embodiment

Figure 11:
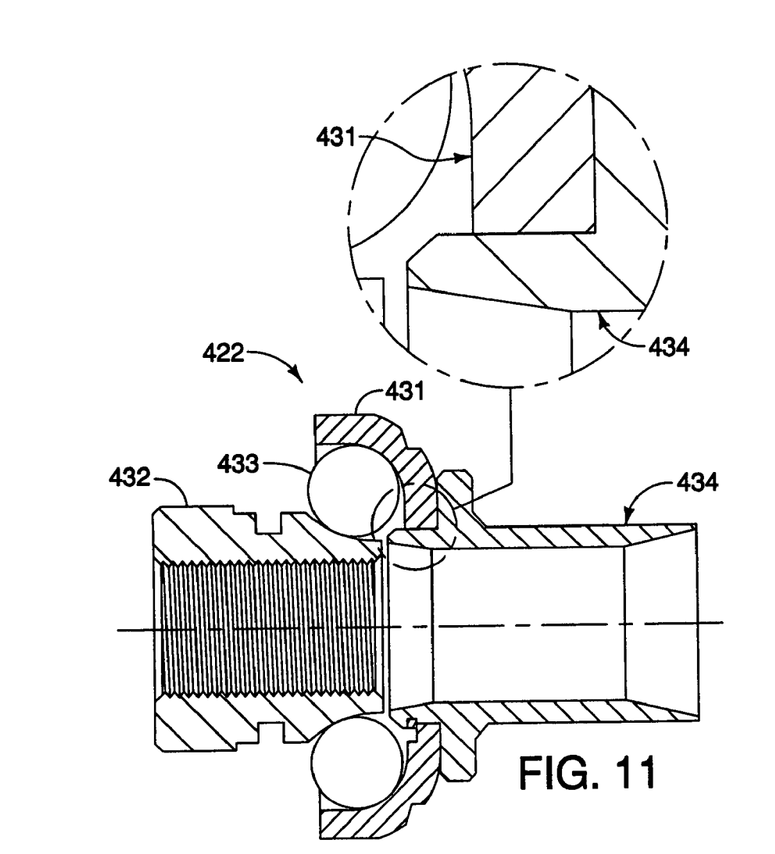
FIG. 11 is an enlarged cross sectional view of a modified bearing for use with anyone of the hubs illustrated in FIGS. 2, 7 and 8 with a modified inner tube coupled to the outer cup in accordance with a fourth embodiment of the present invention.

Referring now to FIG. 11, a modified bearing 422 and a modified inner tube 434 is illustrated in accordance with a fourth embodiment. Basically, the modified bearing 422 and the modified inner tube 434 are configured to be uses with anyone of the hubs 12, 14 and 114 that are illustrated in FIGS. 2, 7 and 8, where a bearing and an inner tube arrangement is utilized. The modified bearing 422 and the modified inner tube 434 are identical to the bearing 22a and the inner tube 34a, respectively, unless otherwise specified below.

The modified bearing 422 of the fourth embodiment basically includes an outer ring or cup 431, an inner ring or cone 432 and a plurality of generally spherical rolling components 433 (only two rolling components 433 are shown in FIG. 11), with the modified inner tube 434 attached to the outer ring 431. The modified bearing 422 of the fourth embodiment differs from the bearings 22a and 22b of the first embodiment in that the innermost peripheral surface of the outer ring 431 is dimensioned to be frictionally retained on the modified inner tube 434. The modified inner tube 434 of the fourth embodiment differs from the inner tubes 34a and 34b of the first embodiment in that the first tubular end section of the modified inner tube 434 is dimensioned to frictionally retain the outer ring 431 on its outer peripheral surface without any fastener or the like.

Fifth Embodiment

Figure 12:
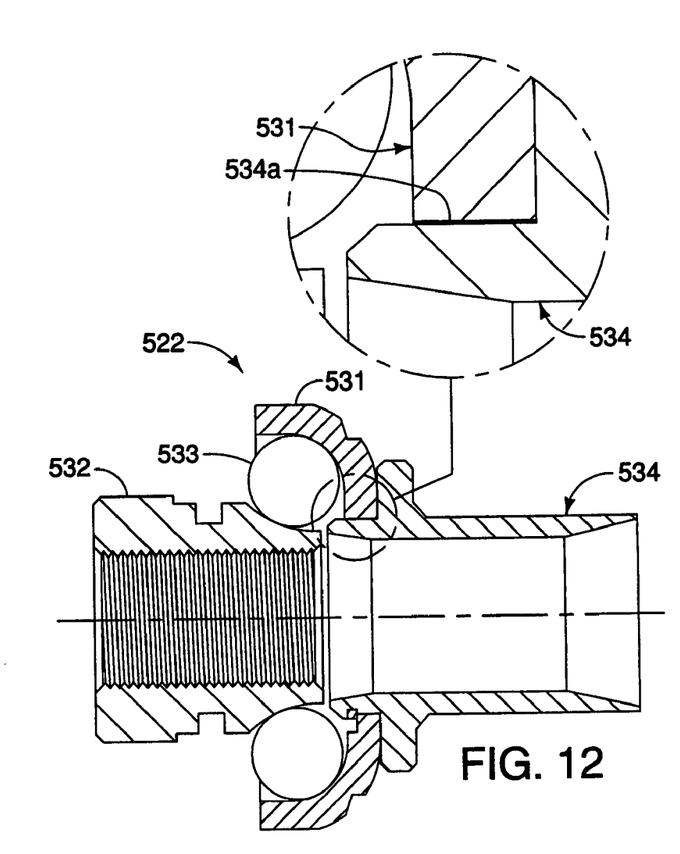
FIG. 12 is an enlarged cross sectional view of a modified bearing for use with anyone of the hubs illustrated in FIGS. 2, 7 and 8 with a modified inner tube coupled to the outer cup in accordance with a fifth embodiment of the present invention.

Referring now to FIG. 12, a modified bearing 522 and a modified inner tube 534 is illustrated in accordance with a fifth embodiment. Basically, the modified bearing 522 and the modified inner tube 534 are configured to be uses with anyone of the hubs 12, 14 and 114 that are illustrated in FIGS. 2, 7 and 8, where a bearing and an inner tube arrangement is utilized. The modified bearing 422 and the modified inner tube 434 are identical to the bearing 22a and the inner tube 34a, respectively, unless otherwise specified below.

The modified bearing 522 of the fourth embodiment basically includes an outer ring or cup 531, an inner ring or cone 532 and a plurality of generally spherical rolling components 533 (only two rolling components 533 are shown in FIG. 12), with the modified inner tube 534 attached to the outer ring 531. The modified bearing 522 of the fourth embodiment differs from the bearings 22a and 22b of the first embodiment in that the innermost peripheral surface of the outer ring 531 is dimensioned to freely slide onto the first tubular end section of the modified inner tube 534. The modified inner tube 534 of the fourth embodiment differs from the inner tubes 34a and 34b of the first embodiment in that the first tubular end section of the modified inner tube 534 is dimensioned to freely slide into the outer ring 531. At least one of the innermost peripheral surface of the outer ring 531 and the outer peripheral surface of the first tubular end section of the modified inner tube 534 is coated with an adhesive 534a to fixedly secure the modified inner tube 534 to the outer ring 531. Thus, the first axial end of the modified inner tube 534 is attached to the modified bearing 522 by an adhesive connection formed therebetween.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
   a hub axle having a first axle end and a second axle end;
   a hub body having a first body end and a second body end with the hub body being coaxially disposed about the hub axle and rotatable with respect to the hub axle;
   a first bearing disposed between the first body end of the hub body and the first end of the hub axle; and
   a second bearing disposed between the second body end of the hub body and the second axle end of the hub axle; and
   an inner tube having a first axial end fixedly attached to the first bearing and a second axial end spaced axially from the second bearing such that the inner tube is held in a cantilever manner by the first bearing, the first axial end of the inner tube being attached to the first bearing at a radially inner location between the first bearing and the hub axle in a radial direction with respect to the hub axle and closer to the hub axle than to the hub body,
   the first bearing including a first outer cup coupled to the hub body with a first outer bearing surface facing towards the first axle end of the hub axle, a first inner cone coupled to the hub axle with an inner bearing surface facing towards the second axle end of the hub axle, and a plurality of first rolling components disposed between the first outer cup and the first inner cone, and
   the first axial end of the inner tube being attached to an inner edge of the first outer cup.

2. The bicycle hub as recited in claim 1, wherein the first axial end of the inner tube is attached to the first bearing by a press fit connection.

3. The bicycle hub as recited in claim 1, wherein the first axial end of the inner tube is attached to the first bearing by a pair of axially spaced apart oppositely facing surfaces with a portion of the first bearing being disposed therebetween.

4. The bicycle hub as recited in claim 1, wherein the inner tube includes an engagement member forming a first retaining surface facing axially towards the second axle end and a radially extending abutment member with an abutment face facing axially towards the first axle end such that an annular groove is formed with the first bearing being disposed in the annular groove between the first retaining surface and the abutment face.

5. The bicycle hub as recited in claim 4, wherein the engagement member is a non-removable part of the inner tube.

6. The bicycle hub as recited in claim 4, wherein the engagement member is a removable and reinstallable part of the inner tube.

7. The bicycle hub as recited in claim 4, wherein the first axial end of the inner tube that forms the annular groove includes at least one flexibility increasing recess.

8. The bicycle hub as recited in claim 7, wherein the flexibility increasing recess extends in a circumferential direction.

9. The bicycle hub as recited in claim 7, wherein the flexibility increasing recess is located adjacent the engagement member.

10. The bicycle hub as recited in claim 7, wherein the flexibility increasing recess is located adjacent the abutment member.

11. The bicycle hub as recited in claim 4, wherein the first axial end of the inner tube that forms the annular groove includes a pair of circumferentially extending flexibility increasing recesses with a first of the flexibility increasing recesses being located adjacent the engagement member and a second of the flexibility increasing recesses being located adjacent the abutment member.

12. The bicycle hub as recited in claim 1, wherein the inner tube has an inner surface with a tapered part located at the second axial end such that the tapered part increases in diameter as the inner surface approaches a free edge of the second axial end of the inner tube.

13. The bicycle hub as recited in claim 1, wherein the inner tube includes a radially extending abutment member with an abutment face facing the first bearing, a first tubular section extending from the abutment face of the abutment member to a first free edge of the inner tube to define the first axial end of the inner tube, and a second tubular section extending from the abutment face of the abutment member in an opposite direction to a second free edge of the inner tube to define the second axial end of the inner tube.

14. The bicycle hub as recited in claim 13, wherein the first tubular section has a first longitudinal length and the second tubular section has a second longitudinal length such that the first longitudinal length fauns a ratio with the second longitudinal length that lies between a ratio range of 1 to 4 and 1 to 6.

15. The bicycle hub as recited in claim 14, wherein the inner tube has an inner surface with a tapered part located at the second axial end such that the tapered part increases in diameter as the inner surface approaches a free edge of the second axial end of the inner tube.

16. The bicycle hub as recited in claim 14, wherein the inner tube includes an engagement member forming a first retaining surface facing axially towards the abutment face of the abutment member to define an annular groove with the first bearing being disposed in the annular groove between the first retaining surface and the abutment face.

17. The bicycle hub as recited in claim 16, wherein
the first axial end of the inner tube that forms the annular groove includes a pair of circumferentially extending flexibility increasing recesses with a first of the flexibility increasing recesses being located adjacent the engagement member and a second of the flexibility increasing recesses being located adjacent the abutment member.

18. The bicycle hub as recited in claim 1, wherein
the hub body is supported by the first and second bearings to rotate freely in both rotational directions on the hub axle.

19. The bicycle hub as recited in claim 18, further comprising
an additional inner tube having a first axial end fixedly attached to the second bearing and a second axial end spaced axially from the second bearing such that the additional inner tube is held in a cantilever manner by the second bearing.

20. The bicycle hub as recited in claim 1, further comprising
a freewheel coupled between the second hub end of the hub body and the second axle end of the hub axle.

21. The bicycle hub as recited in claim 1, further comprising
an additional inner tube having a first axial end fixedly attached to the second bearing and a second axial end spaced axially from the second bearing such that the additional inner tube is held in a cantilever manner by the second bearing.

22. The bicycle hub as recited in claim 1, wherein
the first axial end of the inner tube is attached to the first bearing by a threaded connection formed therebetween.

23. The bicycle hub as recited in claim 1, wherein
the first axial end of the inner tube is attached to the first bearing by an adhesive connection formed therebetween.

* * * * *